US007602955B2

United States Patent
Taguchi et al.

(10) Patent No.: US 7,602,955 B2
(45) Date of Patent: Oct. 13, 2009

(54) OSTEOPOROSIS DIAGNOSIS AIDING APPARATUS UTILIZING PANORAMIC RADIOGRAPHS

(75) Inventors: Akira Taguchi, Hiroshima (JP); Takashi Nakamoto, Hiroshima (JP); Akira Asano, Hiroshima (JP)

(73) Assignee: Japan Science and Technology Agency, Saitama (JP)

( * ) Notice: Subject to any disclaimer, the term of this patent is extended or adjusted under 35 U.S.C. 154(b) by 718 days.

(21) Appl. No.: 10/541,595

(22) PCT Filed: Dec. 25, 2003

(86) PCT No.: PCT/JP03/16591

§ 371 (c)(1), (2), (4) Date: Apr. 21, 2006

(87) PCT Pub. No.: WO2004/060165

PCT Pub. Date: Jul. 22, 2004

(65) Prior Publication Data

US 2006/0239532 A1    Oct. 26, 2006

(30) Foreign Application Priority Data

Jan. 7, 2003  (JP) .............................. 2003-001395

(51) Int. Cl.
 *G06K 9/00* (2006.01)
(52) U.S. Cl. ........................... 382/132; 382/128; 378/62
(58) Field of Classification Search ................ 382/128, 382/132, 256, 258, 259, 266; 378/54, 56, 378/62

See application file for complete search history.

(56) References Cited

U.S. PATENT DOCUMENTS 6,411,729 B1 *   6/2002   Grunkin ..................... 382/132

(Continued)

FOREIGN PATENT DOCUMENTS

JP    11-155849 A   6/1999

(Continued)

OTHER PUBLICATIONS

Yu. Kashima et al., "Kosshitsu no Hyokaho Suri Keitaigaku Ni yoru Honekozo no Kokkaku Tokucho Chushutsu Computed Radiography eno Oyo", Bone, 1996, vol. 10, No. 4, pp. 67 to 75.

(Continued)

*Primary Examiner*—Tom Y Lu
(74) *Attorney, Agent, or Firm*—Rader, Fishman & Grauer, PLLC (57) ABSTRACT

The present invention provides an osteoporosis diagnosis aiding apparatus that utilizes a panoramic radiograph. A digitalized image of the panoramic radiograph enters a personal computer (S210). The cortical bone at the lower edge of the mandibular molar in the panoramic radiograph is specified with a mouse to make that part a target of examination (S220). This extracted image is subjected to the following image processing. (1) Subject the image to median filtering so as to reduce noises throughout that image. (2) Find a skeleton constituted by micro-structural elements (S230). (3) Extract only components parallel to the tilt of the lower edge of the mandible (S240). (4) Binarize the image using Otsu's linear discrimination method, for example (S250). The binarized lines are then classified into three groups according to size, and can be determined as a risk of osteoporosis in a case where there is more than just a single line classified in the largest line group aside from the smallest line group.

4 Claims, 8 Drawing Sheets

U.S. PATENT DOCUMENTS

| | | | | |
|---|---|---|---|---|
| 6,690,761 | B2* | 2/2004 | Lang et al. | 378/56 |
| 7,471,761 | B2* | 12/2008 | Michaeli | 378/38 |
| 7,488,109 | B2* | 2/2009 | Hangartner et al. | 378/207 |

FOREIGN PATENT DOCUMENTS

| | | |
|---|---|---|
| JP | 2000-245722 A | 9/2000 |
| WO | WO-02/30283 A2 | 4/2002 |

OTHER PUBLICATIONS

Shoko Ito, "Kotsuryo Sokutei 13 Texture Bunseki (1) Genri Hoho", Bone, 1996, vol. 10, No. 1, pp. 135 to 141.

Matsubara M. et al., Non-invasive assessment of bone quality, J.Med. Dent.Sci., 1999, vol. 46, No. 4, pp. 165 to 176.

Ryota Kawamata et al., "Daisan Yosui no Kozo Henka Kenshutsuno ni Kansure Kenkyu Kotsumitsudo to Kozo Shihyo tono Hikaku", Journal of Japanese Society of Bone Morphometry, 2002, vol. 12, No. 1, pp. 57 to 63.

International Search Report mailed on Feb. 3, 2004.

Search Report Issued by the European Patent Office Dated Jun. 28, 2006.

Analoui et al., "Morphological Texture Assessment of Oral Bone as a Screening Tool for Ostoporosis," Proceedings of the SPIE, vol. 4322, pp. 1226-1233, Medical Imaging, (2001).

* cited by examiner

FIG. 1

(a) MANDIBLE IN PANORAMIC RADIOGRAPH (b) NORMAL CORTICAL BONE (c) CORTICAL BONE OF PERSON WITH
    DECREASED BONE DENSITY

(a) FIGURE X (b) DEPLOY SIMILAR FIGURES nB TO A STRUCTURAL ELEMENT THROUGHOUT FIGURE (c) LOCUS OF nB CENTERS = SKELETON

OSTEOPOROSIS DIAGNOSIS AIDING APPARATUS UTILIZING PANORAMIC RADIOGRAPHS

TECHNICAL FIELD

The present invention relates to an apparatus for carrying out diagnostic aid of osteoporosis utilizing panoramic radiographs taken during dental care.

BACKGROUND ART

Early detection and early treatment of patients suffering from osteoporosis estimated to be a population of ten million and a potential group thereof currently in Japan is important. Current major osteoporosis diagnostic techniques in Japan are: bone-density measurement of the lumbar spine and the femur by a double X-ray resorption measurement apparatus (DXA) capable of measuring bone density with utmost accuracy; and bone density measurement of the calcaneus through quantitative ultrasonography (QUS) as a simplified method. However, the current state is that only certain facilities are equipped with these apparatus, and are only used for persons with symptoms of osteoporosis such as lower back pain, or persons with great concern for osteoporosis, while not being used for prevention of fractures considered to be caused by osteoporosis.

Figure 1:
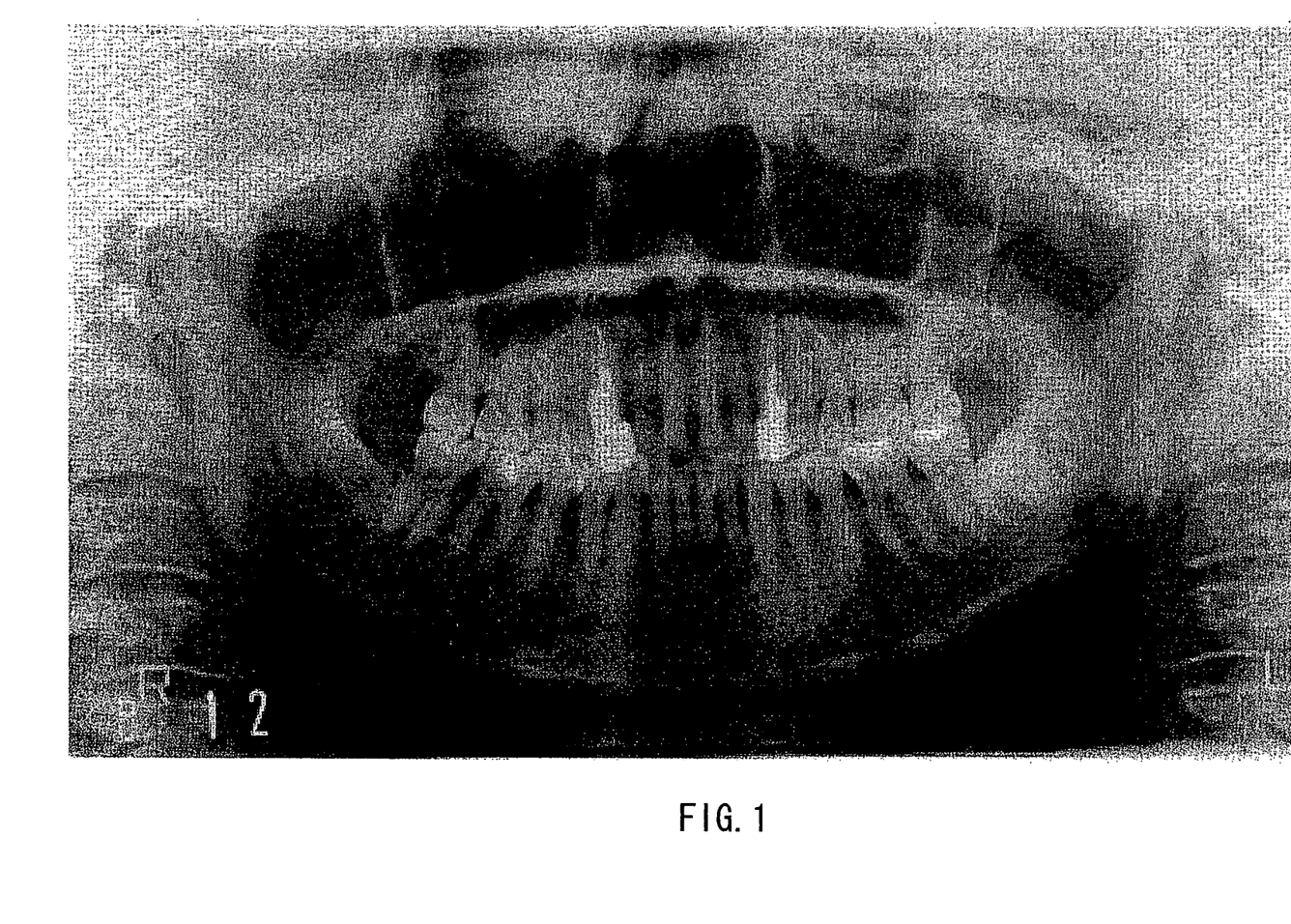
FIG. 1 is a diagram showing an exemplary panoramic radiograph of teeth.

Recent studies claim that a decrease in bone density may bring about alterations in shape of the cortical bone at the lower edge of a mandible (thick compact bone covering the outer side of the mandible bone) in a panoramic radiograph of all teeth and surrounding bones of the chin (see Non Patent Reference 1). FIG. 1 shows an exemplary panoramic radiograph of teeth. In addition, it is understood that persons with an altered shape of the lower edge of the mandible have a significantly higher risk of fracture due to slight external pressure compared to persons without (see Non Patent Reference 2).

Common dental care does not put diagnosis of osteoporosis using panoramic radiographs into practical use since examination of this mandible inferior border area is infrequent and an examiner's reading ability of X-rays is questioned.

Although studies on diagnosing osteoporosis utilizing panoramic radiographs have mainly been centered on altered shapes of a portion called spongy trabecular bone existing in the maxillary bone and the mandible bone (see Non Patent References 3, 4, 5, and 6), diagnosis by automatically extracting only the trabecular bone from a panoramic radiograph is difficult, and therefore has not been put into practical use. It has also been reported that diagnosis is possible from the thickness of the cortical bone at the lower edge of the mandible (see Non Patent References 3 and 7).

If persons at risk of osteoporosis can be screened using panoramic radiographs, screening of persons without subjective symptoms that are difficult to diagnose or persons without concern for osteoporosis, and instruction for only persons potentially having osteoporosis to undergo closer examination such as DXA or referral to a facility equipped with that apparatus allow early detection and early treatment of patients suffering from osteoporosis, and also reduce costs of the examination. Furthermore, the method used for this screening must be simple and usable even without having any special skills or requiring complicated operations.

However, technology for diagnosing a patient suffering from osteoporosis by, for example, focusing on an altered shape of the cortical bone at the lower edge of the mandible in a panoramic radiograph, and objectively and automatically assessing it through mathematical morphologic image processing using computer software does not exist.

[Non Patent Reference 1] E. Klemetti, et al., "Pantomography in assessment of the osteoporosis risk group", Scandinavian Journal of Dental Research, 1994, 102, P68-72

[Non Patent Reference 2] A-M. Bollen, et al., "Case-control study of self-reported osteoporotic fractures and mandibular cortical bone", Oral Surgery Oral Medicine Oral Pathology Oral Radiology and Endodontics, 2000, 90(4), P518-524

[Non Patent Reference 3] J. Negoto, et al., "Study of the relationship between periodontal disease and osteoporosis using parameters of panoramic radiographs and osteoporosis diagnosis", Japanese Society of Periodontology Journal, 2001, 43(1), P13-24

[Non Patent Reference 4] S. Kumasaka, I. Kashima, Initial investigation of mathematical morphology for the digital extraction of the skeletal characteristics of trabecular bone, Dentomaxillofacial Radiology, 1997, 26, 161-168

[Non Patent Reference 5] S. C. White, et al., "Alterations of trabecular pattern of the jaws in patients with osteoporosis", Oral Surgery Oral Medicine Oral Pathology Oral Radiology and Endodontics, 1999, 88(5), P628-635

[Non Patent Reference 6] T. E. Southard, et al., IEE Trans. Biomed. Eng.: 43, 123-132(1996)

[Non Patent Reference 7] A. Taguchi, T. Wada, et al., "Osteoporosis the role of dentistry achieving early diagnosis" Hiroshima University Dental Society Journal, 1993, 25, p525-526

[Non Patent Reference 8] T. Tanbe, et al., "Extraction of trabecular bone of the jaw from panoramic radiographs", The Institute of Electronics, Information and Communication Engineers, 2002, P94

DISCLOSURE OF THE INVENTION

An objective of the present invention is to provide an osteoporosis diagnosis aiding apparatus utilizing panoramic radiographs which can screen persons at a risk of osteoporosis through simple operations.

To reach the above-given objective, the present invention is an osteoporosis diagnosis aiding apparatus utilizing a panoramic radiograph of teeth is characterized by comprising: image region extracting means for extracting an image of a region including a specified portion in the panoramic radiograph of teeth; skeleton processing means for finding a skeleton of the extracted image; line extracting means for extracting only portions parallel to the tilt of the lower edge of the mandible from the found skeleton: binarizing means for binarizing an image including the skeleton so that lines of the skeleton are separated from the background; and determining means for determining whether there is a risk of osteoporosis by classifying the binarized lines according to size.

The determining means can classify the binarized lines into three groups according to size, and determine there is a risk of osteoporosis in a case where there is more than just a single line classified in the largest line group aside from the smallest line group.

The image extracting means may extract an image of a rectangular region parallel to the tilt of the lower edge of the mandible, and the line extracting means may extract horizontal portions of the lines.

A program designed to establish processing of the osteoporosis diagnosis aiding apparatus for a computer system also falls within the scope of the present invention.

BEST MODE FOR CARRYING OUT THE INVENTION

An embodiment of the present invention is described forthwith while referencing the appended drawings.

The present invention is for screening patients suffering from osteoporosis by identifying altered shapes of cortical bone at the lower edge of the mandible in panoramic radiographs using a skeleton, which is a mathematical morphologic image processing method, based on reports of Klemetti et al. (see Non Patent Reference 1).

A method according to the present invention allows screening of a person without subjective symptoms or concern for osteoporosis since panoramic radiographs of a patient who has visited a dental office for dental care are used, and it does not require special operations or skills since diagnosis thereof is carried out semi-automatically. Note that use of a skeleton in panoramic radiographs is described in Non Patent Reference 8.

Figure 2:
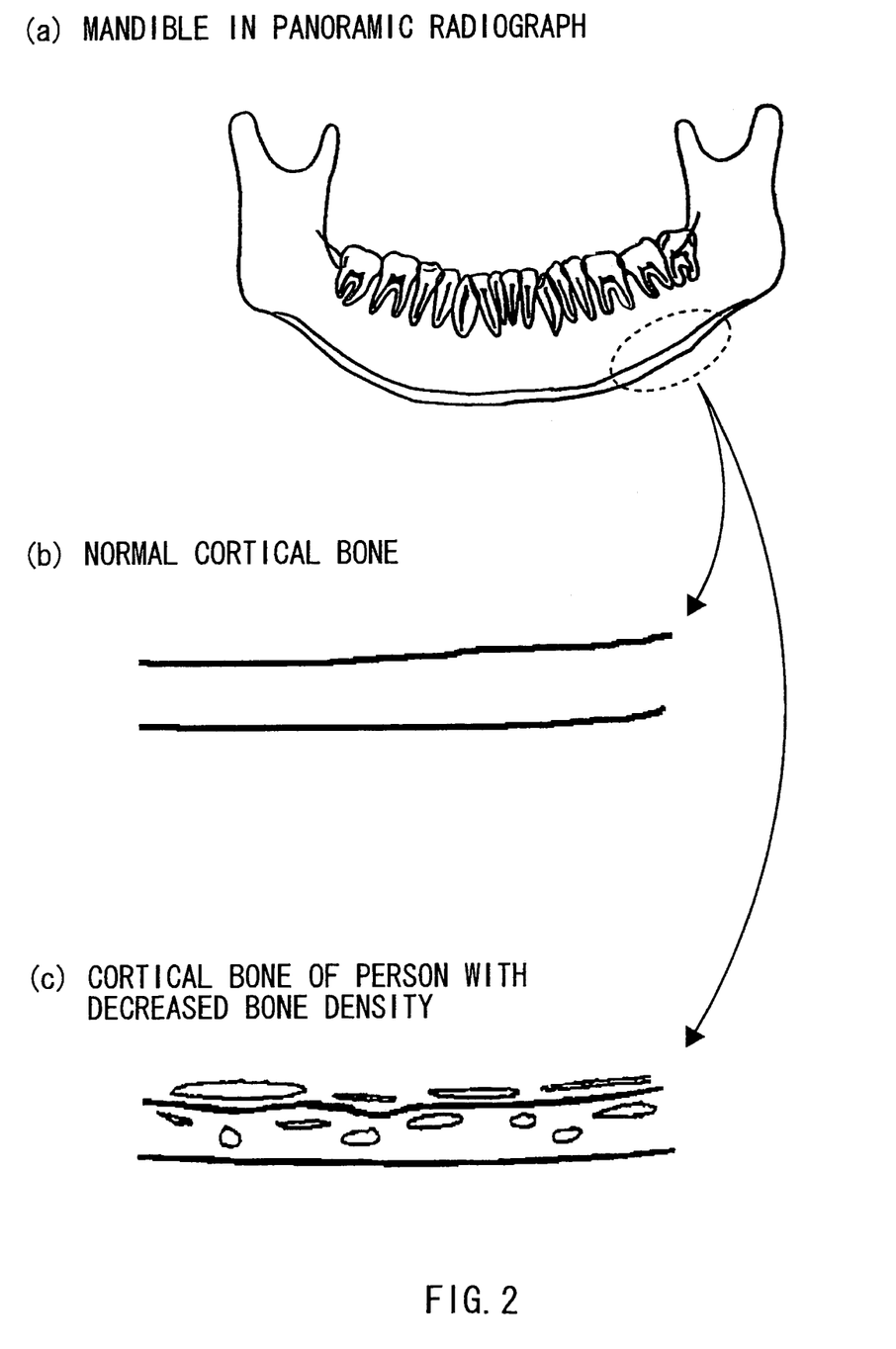
FIG. 2 is a diagram showing a mandible according to a panoramic radiograph, a normal cortical bone and a reduced bone density patient's cortical bone.

FIG. 2A is a schematic diagram of the mandible in the panoramic radiograph of FIG. 1. The inner surface of cortical bone at the lower edge of the mandibular molar of the person who does not have decreased bone density indicated by a dashed line in the panoramic radiograph of FIG. 2A is smooth and has a fixed thickness (see FIG. 2B). However, it is evident that the inner surface linearly resorbs when bone density decreases, making a rough structure (see FIG. 2C). Note that as shown in FIG. 2C, trabecular bone in the upper portion of the cortical bone also decreases in bone density, thereby altering in shape.

The present invention focuses on such altered shape, and detects a person at risk of osteoporosis with decreased bone density by semi-automatically determining whether the inner surface of cortical bone at the lower edge of the mandibular molar is smooth or rough.

This method allows easier diagnosis of osteoporosis as compared to the diagnosis methods based on the trabecular bone or the thickness of the mandibular cortical bone.

The present invention may be implemented using a personal computer (PC) program.

Figure 3:
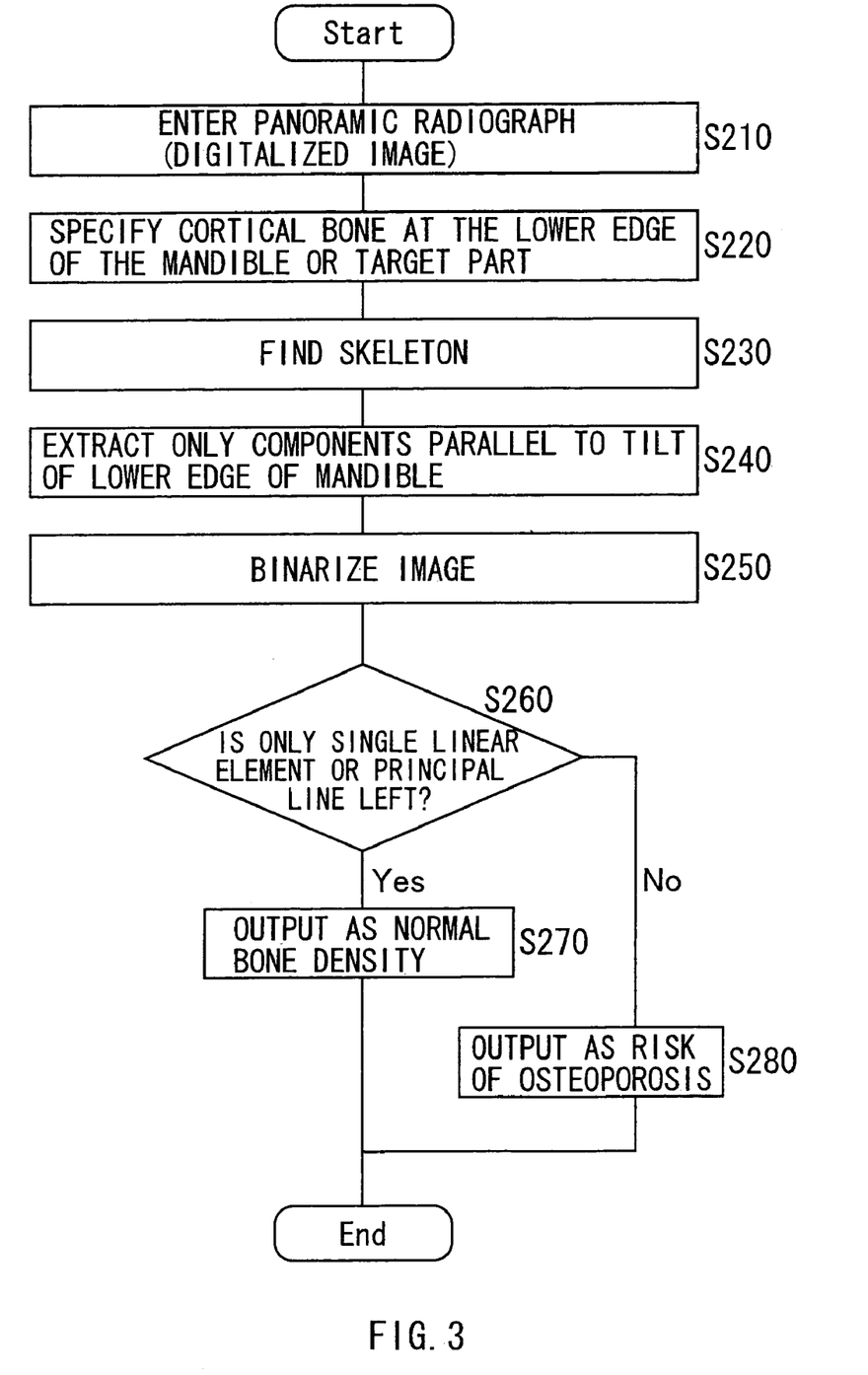
FIG. 3 is a flowchart showing image processing of an osteoporosis diagnostic aiding apparatus.
Figure 4:
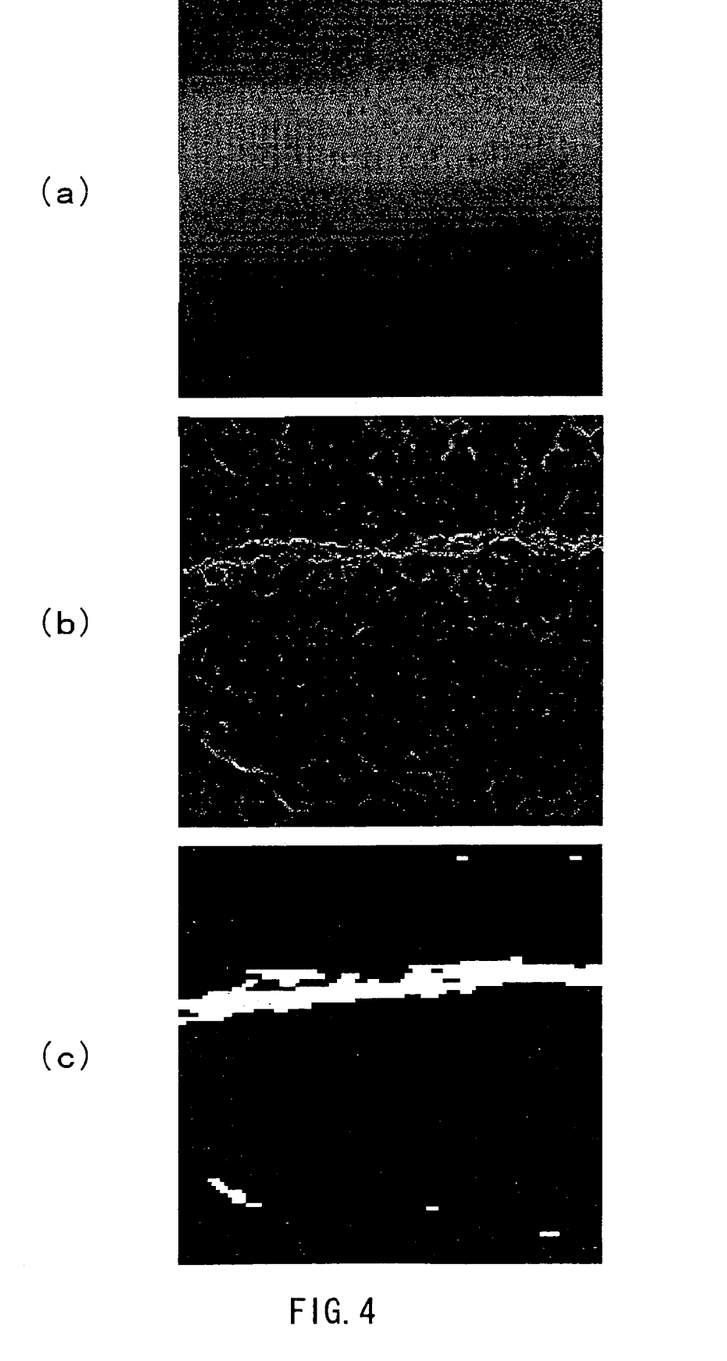
FIG. 4 is a diagram showing image processing for a normal person.
Figure 5:
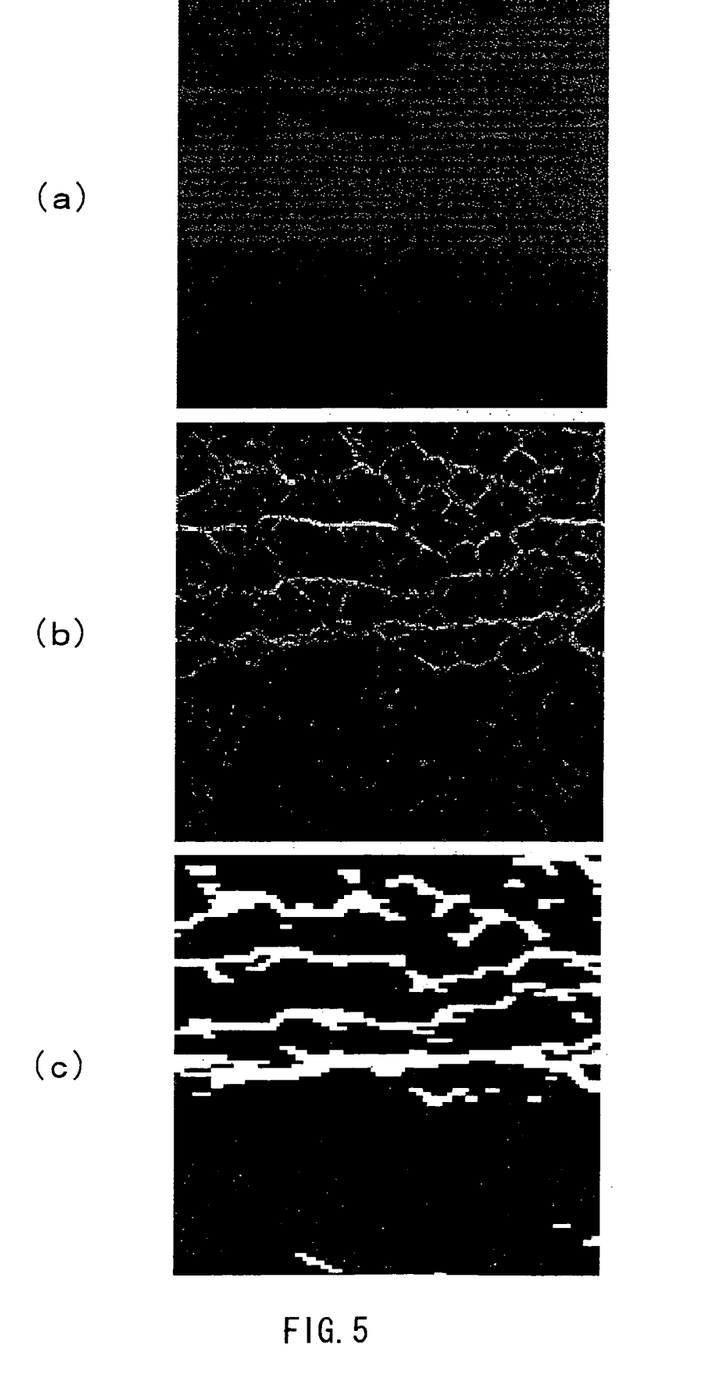
FIG. 5 is a diagram showing image processing for a person with osteoporosis.

The method of the present invention is described based on a flowchart for processing according to the embodiment of the present invention shown in FIG. 3, and extracted images shown in FIGS. 4 and 5. FIG. 4 is an image of a normal person, and FIG. 5 is an image of a person with osteoporosis.

First, a panoramic radiograph (see FIG. 1) to be used needs to be converted to a digital image readable by a personal computer using a scanner or the like. Recommended resolution at this time is 300 dpi or greater. Recently, the conversion using a scanner or the like is not necessary as long as digital imaging devices being popularized are used. In this manner, a digitalized image of the panoramic radiograph enters the personal computer (S210).

The cortical bone at the lower edge of the mandibular molar in the panoramic radiograph is specified with a mouse to make that part a target of examination (S220). The part to be specified is preferably a portion below the first molar tooth. As a result, an area of 100×100 pixels centered on the specified part is extracted, for example (see FIGS. 4A and 5A). Note that the extracted images shown in FIGS. 4A and 5A result from finding a tangent of the lower edge of the mandible in proximity to a specified place and then extracting a rectangle parallel to the tilt of that tangent when extracting that area. This is for facilitating subsequent extraction of only components parallel to the tilt of the lower edge of the mandible.

These extracted images are respectively subjected to the following image processing.

(1) Subject the image to median filtering so as to reduce noises across that image.

(2) Find a skeleton constituted by micro-structural elements (S230).

(3) Extract only components parallel to the tilt of the lower edge of the mandible (S240).

(4) Binarize the image using Otsu's linear discrimination method, for example (S250).

Each processing is described in detail below.

<Median Filtering>

A median filter is used to reduce noises in an image. The median filter is capable of removing noises that considerably differ from values in a surrounding region and are small and scatter randomly. This filter is known as a function of a typical image processing program and is used according to needs.

<Skeleton Processing (S230)>

Skeleton means 'bone structure', and is to trim away the object in the image, creating a bone structure. Assuming the object as X, a skeleton SK (X, B) according to a structural element B is defined as:

$$S_n(X, B) = (X \ominus \overset{v}{nB}) - (X \ominus \overset{v}{nB})_B \quad \text{(Equation 1)}$$

$$SK(X, B) = \bigcup_n S_n(X, B)$$

The above Equation means as follows. First, $$X \overset{v}{\ominus} nB \quad \text{(Term 2)}$$

means 'a set of centers of similar figures nB to the structural element when deploying nBs throughout a figure X'.

Figure 6:
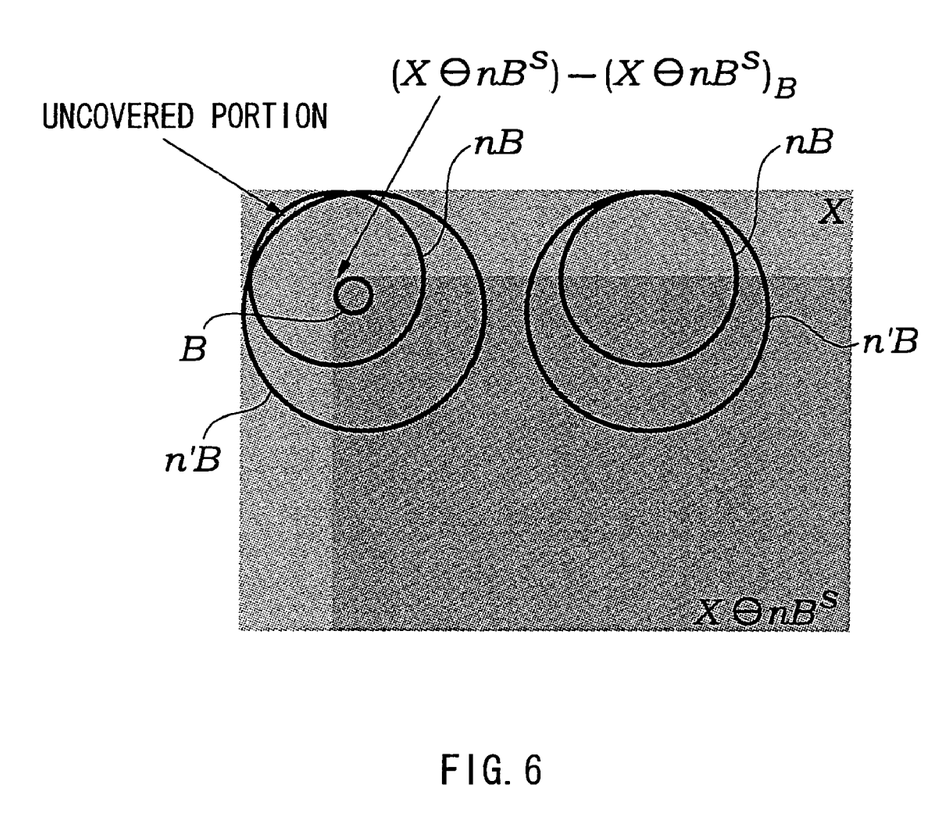
FIG. 6 is a diagram describing the meaning of skeleton.

The meaning of a skeleton is described with reference to FIG. 6 (figure X: rectangle, B: circle).

Assuming n'<n, $$(X \overset{v}{\ominus} nB) - (X \overset{v}{\ominus} nB)_B \quad \text{(Term 3)}$$

The structural element nB (left side) deployed in the center has an uncovered portion even if the larger n'B is deployed inside X. nB (right side) deployed in any other place can be completely covered by n'B that is inside X.

In this manner, $$(X \check{\ominus}_n B) - (X \check{\ominus}_n B)_B \quad \text{(Term 4)}$$

has a property of 'not being able to completely cover when nB is deployed in this position even if a similar figure with a larger n is deployed inside X'. Thus, considering 'completely covering X (e.g., a rectangle) using a similar largest figure to B (e.g., a circle)', nB deployed at $$(X \check{\ominus}_n B) - (X \check{\ominus}_n B)_B \quad \text{(Term 5)}$$

is absolutely imperative and cannot be replaced with a larger similar figure. A collection thereof becomes a skeleton.

Figure 7:
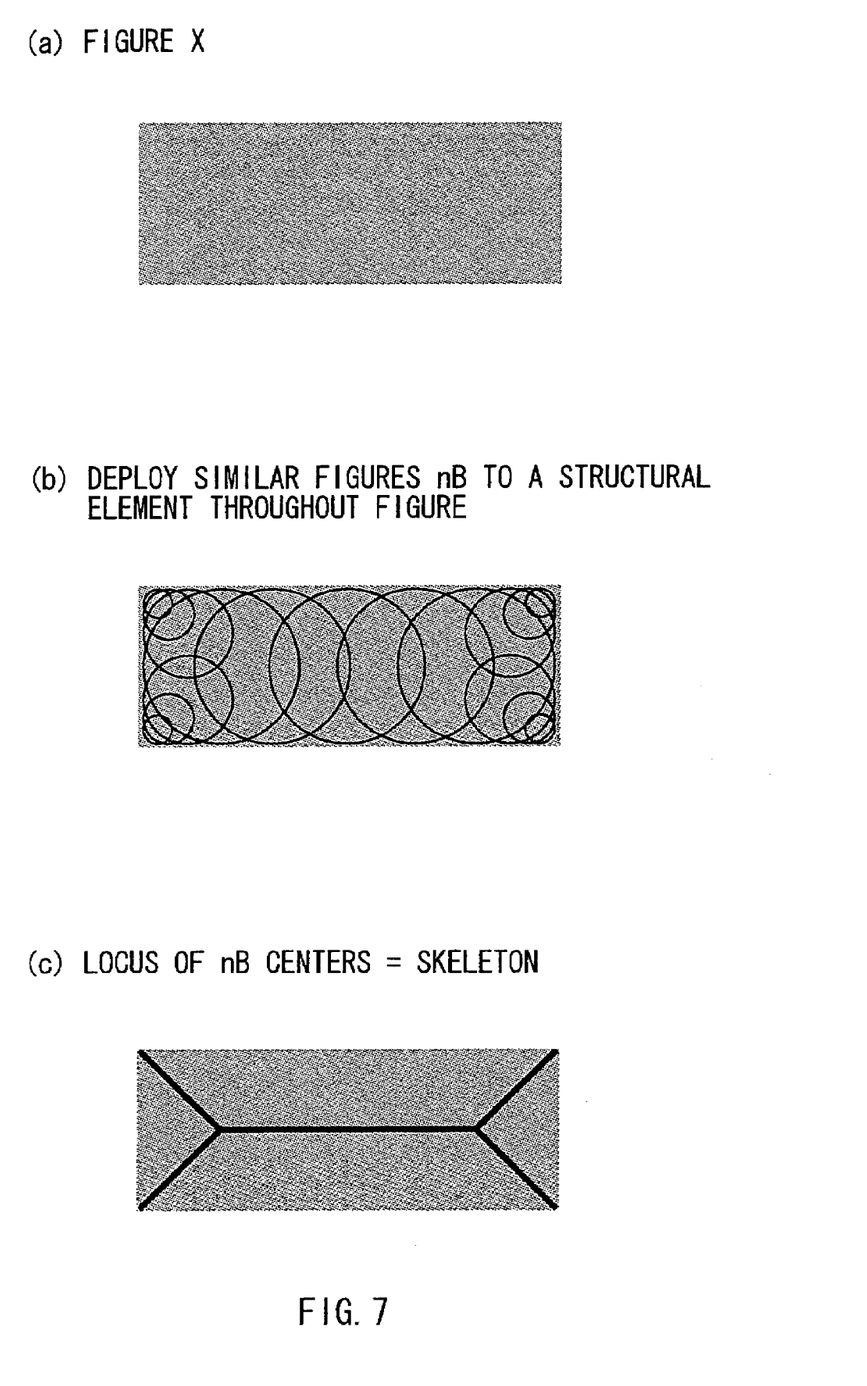
FIG. 7 is a diagram describing processing for providing a skeleton.

Therefore, the skeleton of figure X (rectangle) in FIG. 7A is 'a locus of the centers of similar largest figures to the B (circle) when completely covering X (rectangle) (see FIG. 7B) with those similar largest figures' (see FIG. 7C). The extracted image is constituted by one or more linear elements through this image processing.

FIGS. 4B and 5B are results of subjecting the extracted images of FIGS. 4A and 5A to skeleton processing.

<Extraction of Lines Parallel to Lower Edge of Mandible (S240)>

As a result of carrying out skeleton processing, as shown in FIGS. 4B and 5B, images with fine lines running in various directions can be obtained.

There are bundles of blood vessels in the cortical bone at the lower edge of the mandible. A person with decreased bone marrow may have linear bone resorption along the length of the luminal tissue thereof (see FIG. 2C). Since this resorption appears as a line running parallel to the lower edge of the mandible, extraction of lines almost parallel to the lower edge of the mandible is carried out to detect this line.

More specifically, a rectangular (linear) pattern running parallel to the lower edge of the mandible is prepared, and lines corresponding to that pattern are extracted.

To extract the skeleton images of FIGS. 4B and 5B as rectangles running parallel to the lower edge of the mandible, a horizontal pattern is prepared and lines corresponding to that pattern are extracted. In the case of a skeleton, preparing a diagonal pattern running parallel to the lower edge of the mandible is difficult since the pattern for extraction is small and detailed. Instead, a horizontal pattern should be prepared, and image extraction is carried out in advance so as to provide rectangles running parallel to the lower edge of the mandible.

<Image Binarization (S250)>

While image processing has been carried out thus far using gray-scale images, now, binarization is carried out so that the lines developed through skeleton processing can be separated from the background. Binarization should be carried out by specifying a binarization threshold using Otsu's binarization method (see N. Otsu, 'Automatic threshold selection based on discrimination and least square method', IEICE Transaction, Vol. J63-D No. 4 1980, April), for example.

Resulting mages from extracting only portions parallel to the lower edge of the mandible from the skeleton images of FIGS. 4B and 5B and then subjecting them to binarization are shown in FIGS. 4C and 5C.

<Discrimination of Osteoporosis (S260)>

Linear elements appearing after binarization may be divided into three categories according to the number of pixels (size) thereof.

In order from small to large:
1. Noise Group 2
2. Somewhat small linear elements that have appeared due to linear bone resorption Group 2
3. Principal line of cortical bone at the lower edge of the mandible Group 3

In these classifications, a threshold in number of pixels is necessary for each category.

Figure 8:
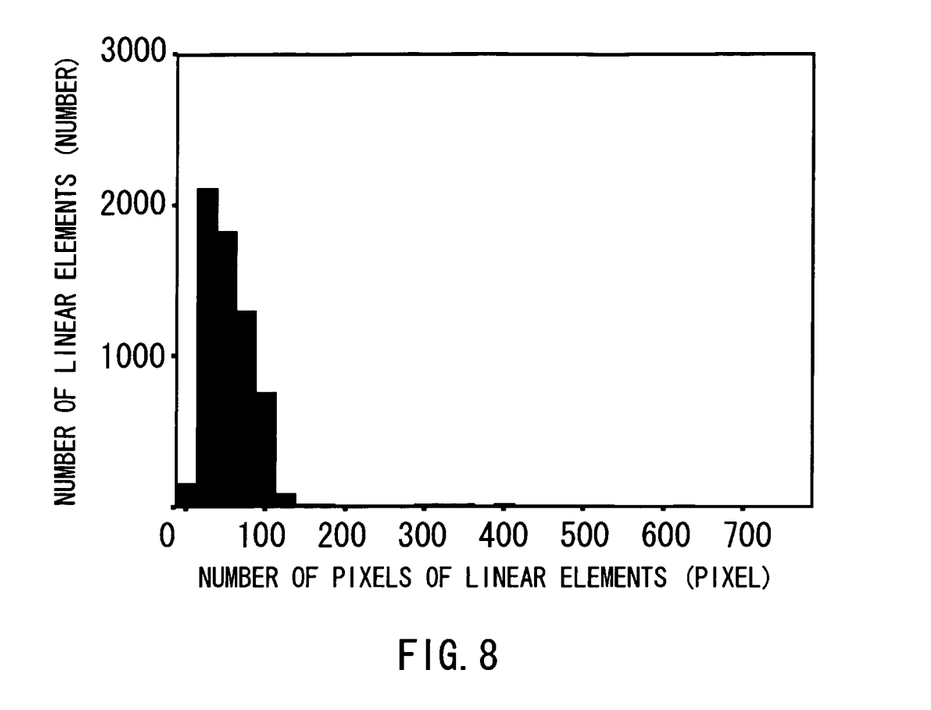
FIG. 8 is a graph showing a histogram of linear elements.

A panoramic radiograph is taken for a patient who has come to the department of radiology at the Hiroshima University Hospital dental clinic for bone-density measurement through DXA, and using 100 copies of the resulting image, the size of the linear elements after image processing is measured, creating a histogram as shown in FIG. 8. As can be understood from FIG. 8, linear elements of a small number of pixels (approximately 0 to 100 pixels) considered to be noises are remarkably increasing. Linear elements of 117 or less pixels or values at the base of the unimodal distribution in the histogram are categorized as noises (Group 1).

Figure 9:
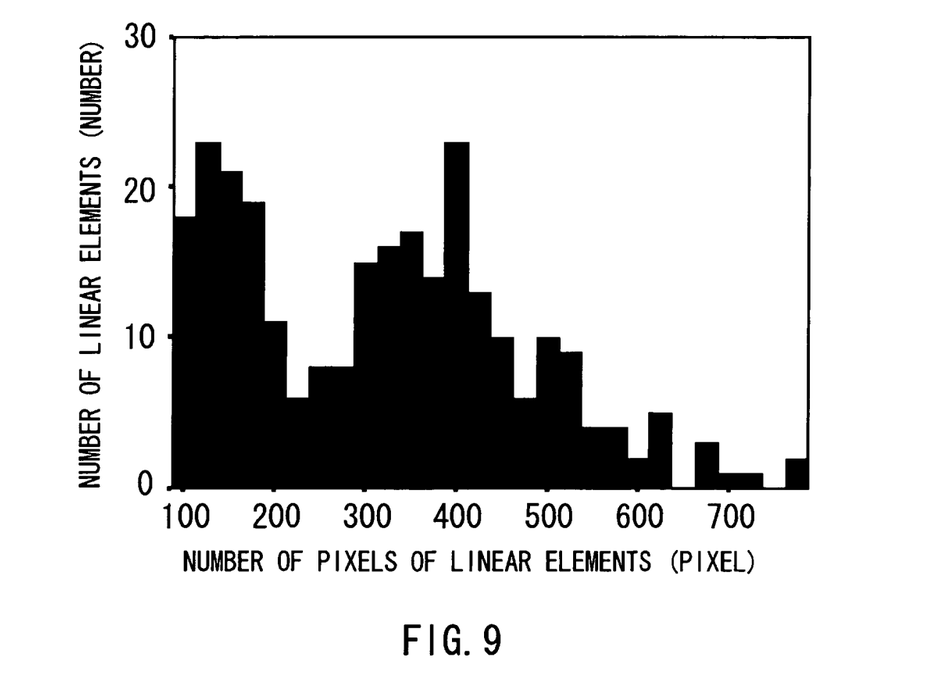
FIG. 9 is a graph showing a partially enlarged histogram of the linear elements.

Next, portions less than 117 pixels are deleted, and a histogram having just larger components is created. The created histogram is shown in FIG. 9. FIG. 9 shows a bimodal distribution and shows that the value in between two peaks is 231 pixels. Accordingly, criteria that linear elements having 231 pixels or greater are categorized as largest linear elements of the cortical bone at the lower edge of the mandible (Group 3) and that linear elements having 118 to 230 pixels are categorized as those that have appeared due to linear bone resorption (Group 2) are made.

The following judgments are made from the results of these classifications (S260).

The noises of Group 1 are not of concern and are disregarded.

Existence of linear elements of Group 2 means a risk of osteoporosis.

Existence of no linear elements of Group 2 and only one linear element of Group 3 means normal.

Existence of two or more linear elements of Group 3 means a risk of osteoporosis since a line due to bone resorption (line of Group 2) probably extends to be a linear element from Group 3.

If the above-given judgments say that there is only a single linear element (principal line) categorized in Group 3 and thus diagnose as normal, 'normal' is output (S270). Otherwise, if they diagnose as a risk of osteoporosis, 'risk' is output and displayed on a display unit or the like (S280).

With the examples of FIGS. 4C and 5C, FIG. 4C, since there is only a single principal line in the images aside from the noises, judgment of normal is output. However, since FIG. 5C has many long lines, judgment of a risk of osteoporosis is output.

EXAMPLES

Panoramic radiographs taken for 100 female patients over 50 years of age who came to the department of radiology at the Hiroshima University Hospital dental clinic for bone-density measurement of the lumbar spine and the femur through DXA are diagnosed using the apparatus according to the present invention. Accuracy of diagnosis by the apparatus according to the present invention is measured using these diagnostic results and diagnostic results through DXA according to diagnostic criteria of the Japanese Society for Bone and Mineral Research (persons with young average bone density under 80% are defined as persons with decreased bone density) as gold standards.

The results are: 82.2% sensitivity (rate of persons with a risk of osteoporosis detected by the apparatus according to the present invention to all the persons with decreased bone density diagnosed using DXA); 60.0% specificity (rate of persons detected by the apparatus according to the present invention as having normal bone density to all the persons with normal bone density diagnosed using DXA); and 70.0% correct diagnosis rate (matching rate between all diagnostic results using DXA and all diagnostic results by the apparatus according to the present invention.)

Twenty-seven practicing dentists at the Hiroshima Prefecture Kure City Dental Practitioner's Association made diagnosis using 100 copies of the same panoramic radiograph to measure diagnostic accuracy in the same way.

The results are: approximately 77% sensitivity, approximately 40% specificity, and approximately 58% correct diagnosis rate. This allows further accurate screening of a person at risk of osteoporosis than by practicing dental practitioners.

Note that the present invention is not limited to the above embodiment, and various modifications are possible within the scope of the present invention.

INDUSTRIAL APPLICABILITY

Since a necessary operation for diagnosis can be reduced to being only specifying a body part with the osteoporosis diagnosis aiding apparatus utilizing panoramic radiographs according to the present invention, diagnostic ability of the examiner is not particularly questioned.

Furthermore, implementing this apparatus in digital imaging devices being popularized will allow wide usage thereof at private dental clinics.

Panoramic radiography is often used for odontopathy diagnosis at dental clinics and is practiced with higher frequency than other types of radiography used for medical use. Therefore, more persons without concern for osteoporosis may be screened as compared to using the conventional methods.

After screening with the apparatus according to the present invention, patients with a risk of osteoporosis are instructed to undergo DXA testing at another facility, thereby contributing to early detection and early treatment.

The invention claimed is:

1. An osteoporosis diagnosis aiding apparatus utilizing a panoramic radiograph of teeth, comprising:
    image region extracting means for extracting an image of a region including a specified portion in the panoramic radiograph of teeth;
    skeleton processing means for finding a skeleton of the extracted image;
    line extracting means for extracting only portions parallel to the tilt of the lower edge of the mandible from the found skeleton:
    binarizing means for binarizing an image including the skeleton so that lines of the skeleton are separated from the background; and
    determining means for determining whether there is a risk of osteoporosis by classifying the binarized lines according to size.

2. The osteoporosis diagnosis aiding apparatus according to claim 1, wherein
    the determining means classifies the binarized lines into three groups according to size, and determines there is a risk of osteoporosis in a case where there is more than just a single line classified in the largest line group aside from the smallest line group.

3. The osteoporosis diagnosis aiding apparatus of claim 1 or 2, wherein
    the image extracting means extracts an image of a rectangular region parallel to the tilt of the lower edge of the mandible, and
    the line extracting means extracts horizontal portions of the lines.

4. A program designed to establish processing of the osteoporosis diagnosis aiding apparatus according to claim 1 or 2 for a computer system.

* * * * *